United States Patent [19]

Goulter

[11] Patent Number: 4,513,936
[45] Date of Patent: Apr. 30, 1985

[54] ADJUSTABLE SUPPORT FOR COOKING POTS AND THE LIKE

[76] Inventor: Victor H. Goulter, 485 Molimo Dr., San Francisco, Calif. 94127

[21] Appl. No.: 478,685

[22] Filed: Mar. 25, 1983

[51] Int. Cl.³ .............................................. F16L 3/00
[52] U.S. Cl. .................... 248/122; 248/156; 248/545
[58] Field of Search ............... 248/156, 121, 122, 538, 248/533, 545, 124, 125; 211/183; 126/25 A, 25 R, 30, 29, 59, 26

[56] References Cited

U.S. PATENT DOCUMENTS

| | | | |
|---|---|---|---|
| 1,091,491 | 3/1914 | Ebur | 248/533 |
| 1,594,708 | 8/1926 | Briggs | 248/121 |
| 2,522,223 | 9/1950 | Hardin et al. | 126/30 UX |
| 2,751,174 | 6/1956 | Parker | 248/156 |
| 3,139,252 | 6/1964 | Mann | 248/538 |
| 3,195,531 | 7/1965 | Groff | 248/156 X |
| 3,360,224 | 12/1967 | Baumann | 248/156 X |
| 4,120,279 | 10/1978 | White | 248/156 X |
| 4,331,125 | 5/1982 | Storandt | 126/29 X |

FOREIGN PATENT DOCUMENTS 2721615 11/1978 Fed. Rep. of Germany ........ 126/25 AA
1068257 6/1954 France ................................ 126/29

Primary Examiner—J. Franklin Foss
Attorney, Agent, or Firm—David Pressman

[57] ABSTRACT

An adjustable support, e.g. for campfire cooking comprises a first member or rod (1) having an angled slot (2) at the upper end and a spiked opposite end for vertical mounting in the earth near a campfire (12); a second removable extension handle member (7) has a tapered slot (5) for insertion into the first member slot (2) and a protruding extension arm and hook (8) on which to hang swing-handled cooking containers, with a wooden handle (6) therebetween such that the said containers can be lowered or raised by adjusting slot (5) in slot (2) or turned to or from the fire by swiveling peg (1) in the ground, or lifted free of slot (2) for remotely carrying hot foodstuffs. Furthermore, said peg (1) has feet such that it can alternatively be leaned against and supported by rocks, enabling said slot (5) to be inserted and adjusted to raise or lower swing-handled containers relative to campfire (12); said second member is removable for the safety and convenience of campfire cooking.

17 Claims, 9 Drawing Figures

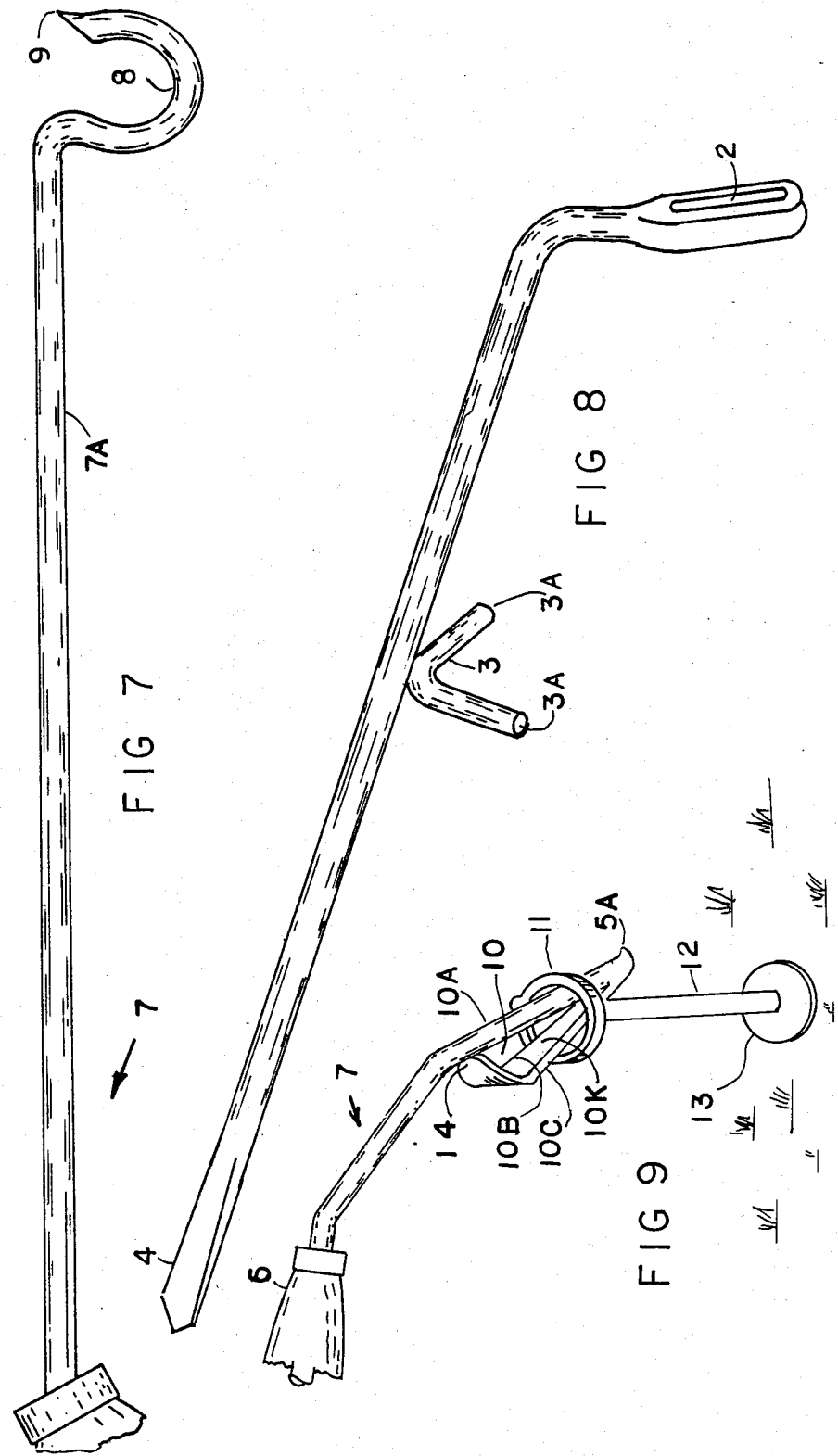

ADJUSTABLE SUPPORT FOR COOKING POTS AND THE LIKE

BACKGROUND

FIELD OF INVENTION

This invention relates to an adjustable support, jack, or holder for supporting cooking pots, such as a billy (metal pot), coffee pot, kettle, or any swing-handled container, device, cooking utensil, e.g., over a campfire.

In the past, when boiling liquid in a billy or coffee pot over a campfire, the usual methods were: (a) supporting the billy or coffee pot on stones or rocks and lighting a fire under it; (b) supporting it on wooden rails or logs and light a fire therebetween; (c) propping a branch of a tree up with a forked stick and hanging the billy or coffee pot from it; (d) supporting a steel plate with rocks or wood then placing the billy or coffee pot on the plate; (e) setting the billy or coffee pot on the ground and lighting a fire beside it; (f) tying a tripod of sticks together, placing it over the fire, then hanging the billy by chains or wire; (g) driving a spiked stick into the ground at an angle, then hanging the billy from the top end; and (h) driving two forked sticks into the ground, placing a spanning stick across them, then hanging the billy or coffee pot from it with a chain or wire.

All of the above methods have resulted in accidents and injury, generally by scalding if the billy tipped over unexpectedly, or by hot ash and steam getting into the mouth or eyes when boiling liquid overflowed or was spilled into the fire. Sometimes the hot billy was accidentlly taken off the fire by hand, causing burned fingers, which in turn caused the billy to be dropped, thus scalding the user and possibly bystanders.

Although many thousands of accidents have occured, and many disastrous forest and bush fires have resulted, people continue to go camping for relaxation, and to light fires to boil liquid in a billy or a coffee pot, and to do other cooking in containers mounted over campfires.

OBJECTS

Accordingly, several objects of the present invention are to provide an adjustable support or jack to hold a billy, coffee pot, or any other swing-handled container or utensil over a campfire in a safe manner; to provide means for removing the hot utensil and carrying it in safety, or returning it to the fire for maintaining heat therein; to provide means for lowering, raising, or turning the container to or away from the fire; to provide a simple, easy to use jack for use on soft, hard, rocky or sandy soils, such that the fire can be made where it is especially safe, before the jack support is installed; and to provide a means for removing the hot lid from a campfire container, and then pouring tea or coffee into cups and the like. Further objects and advantages of my invention becomes apparent from a consideration of the drawings and description thereof.

DRAWINGS

Sheet No. 1

Sheet No. 3

Figure 6:
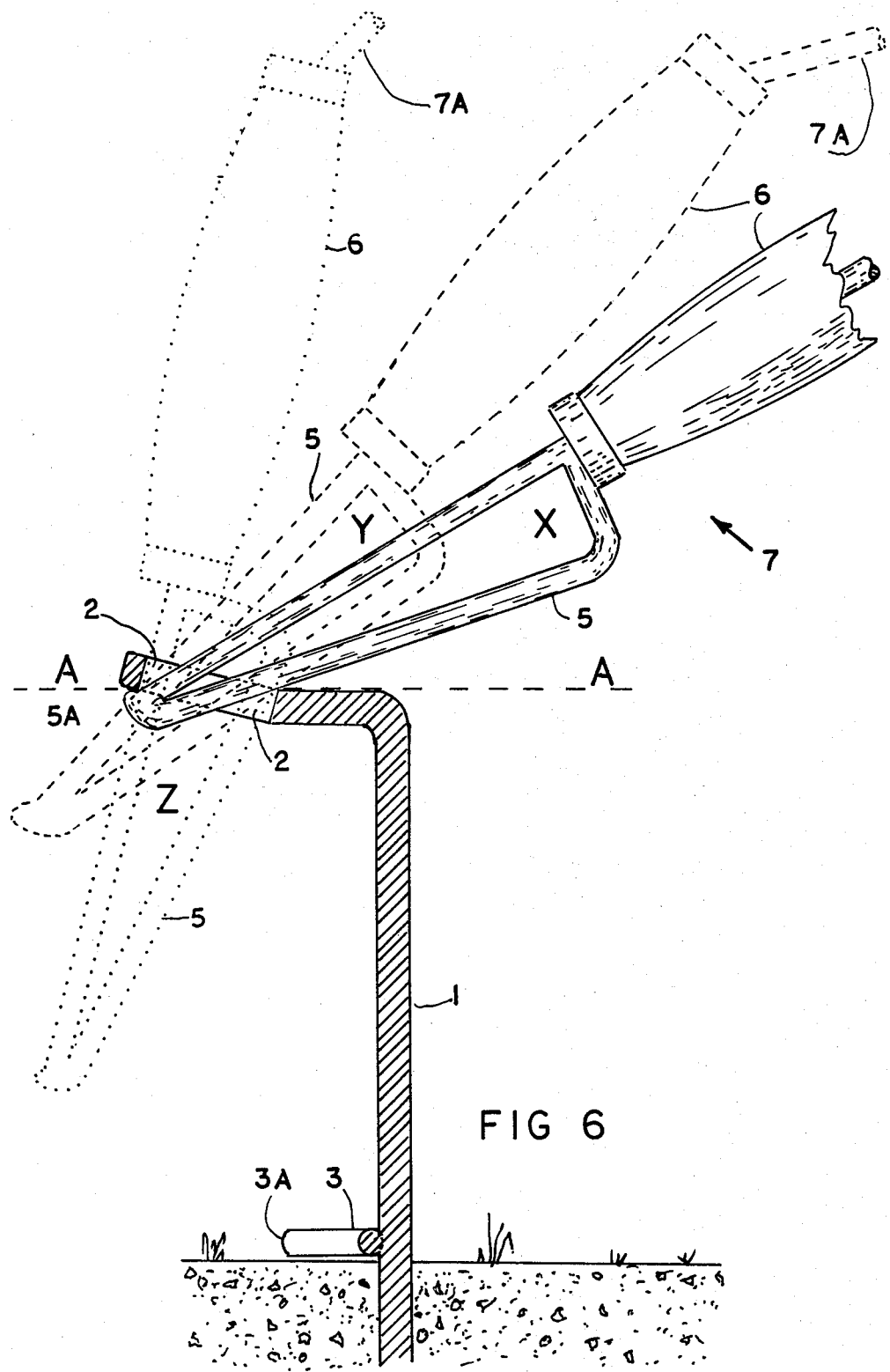

FIG. 6 is a part sectional, part perspective, and part superimposed view of the fixed and removable parts of the invention.

Sheet No. 4

FIG. 7 is a perspective side view of the extension arm of the removable handle member of the invention.

FIG. 8 is a perspective view of the fixed member of the invention (removed from the ground)

FIG. 9 is a perspective view of an alternative taper and ring method of the adjustable support of the invention.

FIGS. 1-8—DESCRIPTION

The adjustable support of the present invention comprises two separate parts, a fixed rod 1 and a removable handle member 7.

Figure 1:
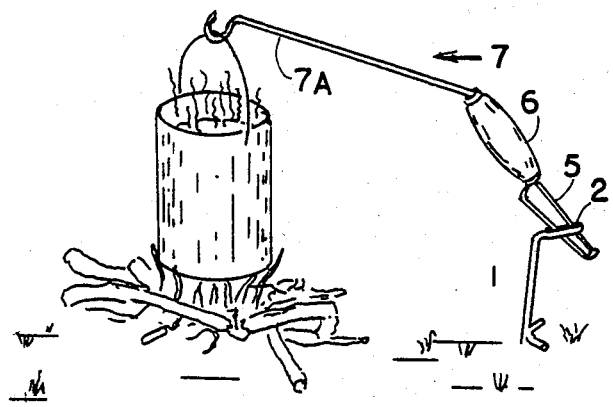
FIG. 1 is a perspective side view of the adjustable support of the invention.
Figure 2:
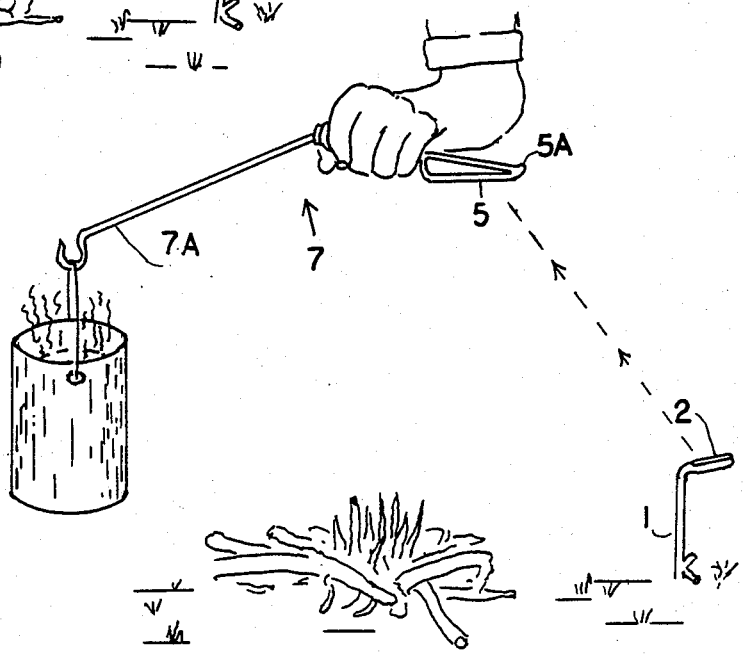
FIG. 2 is a perspective side view of FIG. 1 with the removable handle member removed from the fixed member.

FIGS. 1, 2, 4, 5, 6 and 8 show fixed rod 1, having its upper part angled and bent back to form a slot 2 at its upper end. Rod 1 is about 6 mm (¼ in) in diameter and the part thereof which forms slot 2 is flattened, as shown in FIG. 8. Slot 2 is set at an angle of about 95 degrees to the stem portion of rod 1, and has an opening about 25 mm × 6 mm (1 × ¼ in). The stem portion of rod 1 is about 260 mm (10 in) long. Its bottom end 4 (FIG. 8) is pointed for easier insertion into the ground. Metal bracket 3 with spread-apart feet 3a (each about 25 mm [1 in] long) is welded to fixed rod 1 about 75 mm to 130 mm (3 to 5 in) from slot 2. Bracket 3 forms a stop when rod 1 is inserted into the ground, as shown in FIGS. 1, 2, and 6.

Figure 4:
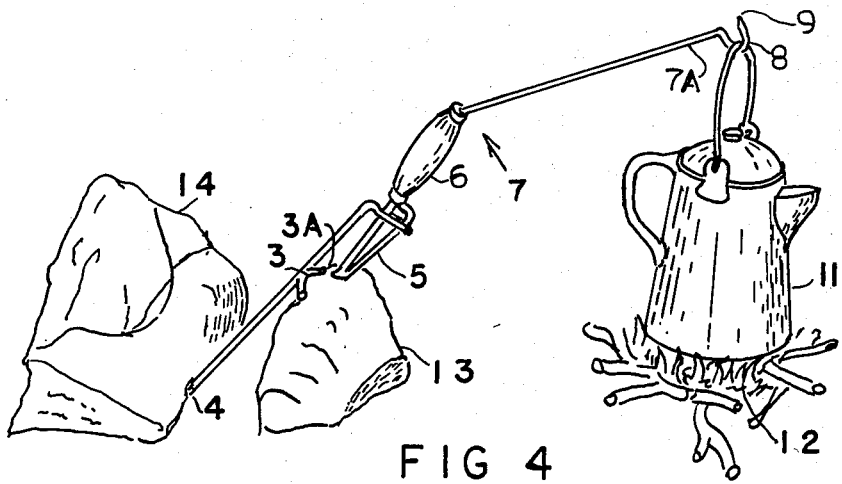
FIG. 4 is a perspective side view of the adjustable support of FIG. 1 rearranged to be anchored by rocks.
Figure 5:
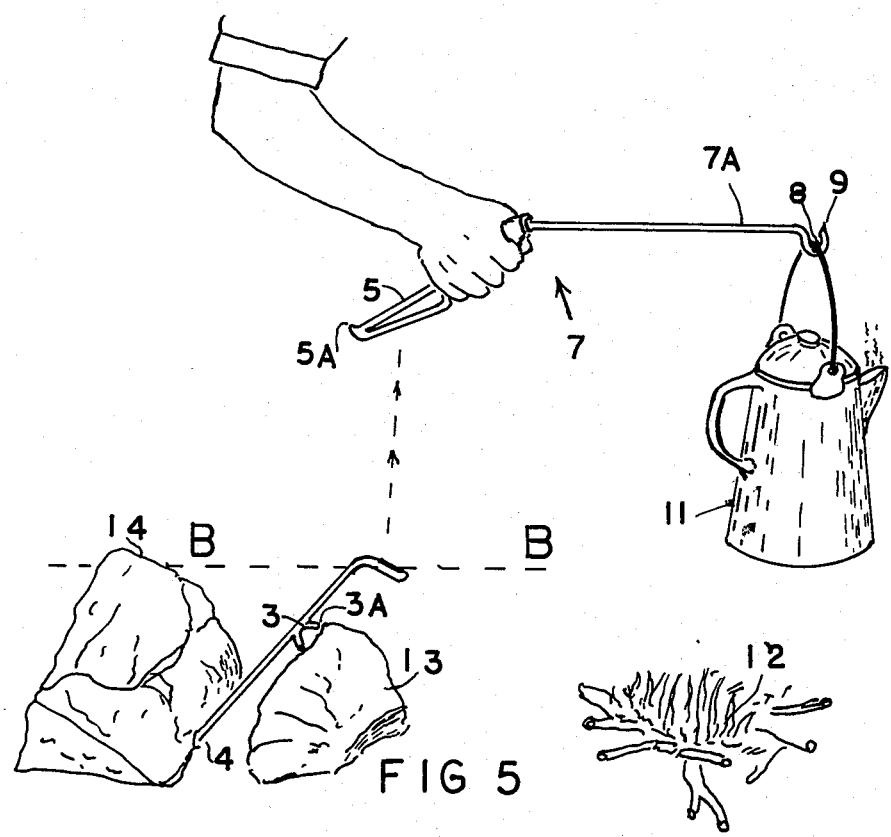
FIG. 5 is a perspective view of FIG. 4 with the removable handle member removed from the fixed member.

Alternatively, when the rod must lean against and be supported by rocks 13 (FIGS. 4 and 5), said feet 3a provide support and rigidity for fixed rod 1 and its slot 2. An additional rock 14 provides stability by its weight against flattened and pointed end 4 (FIGS. 4, 5, and 8).

In one preferred configuration of the invention, slot 2 (FIG. 6) is shown is shown set at an angle such that the top edge of slot 2 (farthest from the rod) is approximately level or horizontal with the bottom edge of elongated slot 2 at the opposite end. This is shown by line A—A (FIG. 6). When rod 1 is to be supported by rocks, as in FIGS. 4 and 5, the lower edge of the slot, (nearest the peg), becomes approximately level or horizontal with the upper edge of the elongated slot (furthest from the peg). This is shown by line B—B (FIG. 5).

Removable handle member 7 comprises an extension arm 7a. Hook 8 provides a hanger for the swing-handles of billies, coffee pots, and other cooking utensils and containers. Extension arm 7a is 250 mm (10 in) in length and 5 mm (3/16 in) in diameter. The handle is 100 mm (4 in) in length and 25 mm (1 in) in diameter. The loop end 5 with raised horn 5a is about 100 mm (4 in) in length and tapers from a width of about 27 mm (1 1/12 in) at the handle to 8 mm (⅜ in) at the horn end. The present invention can be made in small sizes for backpackers and large sizes for family picnics, from steel, aluminium or any other suitable material. The size de-

FIG. 6—RELATIVE POSITIONS OF TAPER IN SLOT

It will be seen in (FIG. 6) that the two parts are assembled by inserting loop end 5 into slot 2, and that the angle of extension arm 7a to the horizontal, and hence the height of hook 8 can be adjusted with infinite resolution over a wide range by varying the depth loop end 5 is inserted into slot 2. The further loop end 5 is inserted into slot 2, the greater will be the angle between loop end 5 and the horizontal, resulting in a higher positioning of hook 8 at the end of extension arm 7a. For each 1.5 mm (1/16 in) that loop end 5 is inserted into slot 2, the angle will increase by about 1 degree. Therefore, if loop end 5 (FIG. 6) is in position "X" and is then further inserted an additional 75 mm (3 in) into slot 2 to position "Z", the angle between extension arm 7a and the horizontal will increase from approximately 5 degrees to approximately 50 degrees. Assuming extension arm 7a to be 38 cm (15 in) long, hook 8 would assume an 18 cm (7 in) higher position, thereby raising any cooking utensil by that amount. Any other position between the lowest (X) and highest (Z), e.g., that of position (Y) (FIG. 6) is possible.

Fixed rod 1 can easily be pivoted in the ground so that extension arm 7a and hook 8 can be turned away from or to the campfire, for such purposes as adding more fuel to the fire or cooling the food and the like.

In practise, fire 12 (FIGS. 1 and 2) is lit in a safe and convenient place, to minimize the danger of bushfire, preferably in a shallow depression dug into the ground with pointed end 4 (FIG. 8) of rod 1. Rod 1 is then inserted into the ground at the correct distance from the fire (about 35 cm [14 in]), and loop end 5 of removable handle member 7 is inserted into slot 2. Horn 5a is provided to prevent loop end 5 from slipping out of slot 2 when extension arm 7a is lowered to its lowest position.

A billy or coffee pot 10 is then hung from hook 8 and turned to left or right or lowered or raised, to obtain the desired heat from the fire. When the water boils, the billy or coffee pot can be swiveled away from the fire and soup bouillon, tea leaves, coffee ground, or other flavoring added to the water. It may be necessary to return the billy or coffee pot nearer the fire for a few minutes: this can be done by swivelling. Thereafter, while holding handle 6, the pot 10 can be completely removed from the fire (FIG. 2) by disengaging loop 5 and horn 5a from slot 2 and removing the handle member 7.

Figure 3:
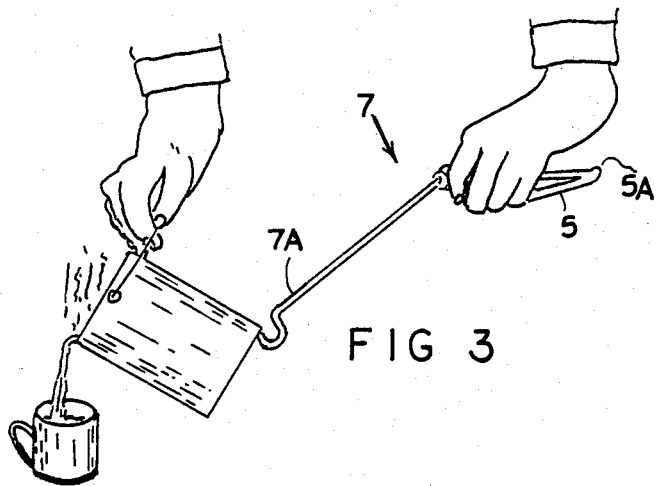
FIG. 3 is a perspective side view of the removable handle member of FIG. 2 hooked under a workpiece Sheet No. 2

For safety reasons, hook 8 is designed as a segment of a circle (FIG. 7), so that the swing handle of a cooking utensil will not accidently disengage during normal cooking and carrying, even if extension handle member 7 is carelessly hung. After the handle cools, spur 9 (FIG. 3) can be used to engage the bottom rim of a billy to angle it for pouring the tea into cups. Spur 9 may also be used for removing the lids of cooking utensils. When the fire is no longer needed, the earth removed to make the depression can be returned to cover any remaining coals of the fire, and unwanted coffee or tea or water poured over to make it safe and unlikely to cause a bushfire.

It should be understood that the angles indicated between rod 1 and slot 2 thereon, and the angles shown in the drawings of removable arm member 7 and loop end 5 are only one preferred embodiment of the invention. These angles can be varied considerably without having serious effects on its operation, adjustability and versatility. The preferred taper of loop end 5, is 5 to 1; however this can be varied very considerably without having serious effect on its operation and adjustability in slot 2 of the fixed peg. Also slot 5 taper can be made from solid material and have no opening.

FIG. 9—TRIANGULAR TAPER AND RING

A variation of the configuration of the loop on the handle of the present invention is shown in FIG. 9. Here the loop 10 comprises two sides 10A and 10K. Side 10K has a triangular shape and provides two bearing surfaces 10B and 10C, and is joined to side 10A at tip 5A and at its widened end by a welded extension bent portion 14. Loop 10 is positioned in a ring or hole 11, fitted or welded to the upper end of a peg 12, which includes a spike at its bottom end (not shown) for inserting into the ground. A stop 13 engages the ground. The rest of the handle extension 7 is the same as that of FIG. 7. One of the advantages in making loop 10 or loop 5 taper as described is to provide lightness and simplicity for manufacturing, however both may be made from solid material without it having any effect on the adjustability of the invention.

Triangular taper 10 and ring or hole 11 perform the same variable position action as loop 5 and slot 2 (FIG. 6). In addition, the triangular taper can be swiveled within the circle of the ring or hole 11, thus avoiding the necessity of swiveling the rod itself in the ground to get radial adjustment of extension arm 7a. In the same manner that loop 5 can be removed from slot 2, so can the triangular taper 10 be removed from the ring or hole 11, for the purpose of safety and convenience of handling and carrying away hot utensils and their contents.

While the above description contains many specificities, these should not be construed as limitations on the scope of the invention, but rather as an exemplification of one preferred embodiment thereof. Many other variations and adaptations are possible. For example, suitable adaptations of the removable handle member can be used to safely and remotely move toxic matter at industrial, laboratory, and other sites, to and from conveniently located slots or rings. Also, the hinge joint described in the present invention as a looped end and slot, or as a triangular taper and ring or hole, can be used on hospital bed ends or support stands for the quick attachment and positioning of a variety of life-support equipment, such as transfusion devices; similarly, it can be used in laboratories. Additionally, a pair of slots 2 can be positioned near the top of a frame, and a pair of loops 5 attached to the underside of a drawing board, such that when the loops are engaged into the slots, the drawing table can be positioned at a desired tilt. Such a drawing table could also be removed for storage. Furthermore, this type of adjustment and separable hinge joint can be used in light-fitting systems, or on book-holders for the incapacitated, and in many other places and circumstances where an adjustable and separable hinge joint, without bolts or nuts or pins is needed. Accordingly, the scope of the invention should be determined not solely by the embodiment illustrated, but by the appended claims and their legal equivalents.

I claim:

1. An adjustable support, comprising:
   a first member having means for supporting itself on a level base surface and comprising a flat holding portion and means for holding said flat portion spaced up from said base surface, said flat portion having an opening defined by edges which are oriented in a generally horizontal position within the plane of said flat portion, and a second member, said second member being elongated in shape and unattached so that it is freely moveable, one end thereof comprising a tapered section, the wider end of said tapered section being wider than the maximum dimension of said opening of said holding portion, said tapered section having oppositely-facing tapered edges and said tapered section and said opening being sized and shaped so that said tapered section can be partially inserted into said opening and tilted to one side so that it can be positioned in any of a range of angular positions in said opening with its oppositely-facing tapered edges in contact with the opposite edges of said opening, such that said second member will be self supporting in any of a range of positions when its tapered section is placed in said opening and such that the height of the opposite end of said tapered portion can be adjusted, said second member having means for holding a workpiece at its other end.

2. The adjustable support of claim 1 wherein said tapered section of said second member comprises an open portion.

3. The adjustable support of claim 1 wherein said second member comprises an insulated handle portion adjacent said tapered portion.

4. The adjustable support of claim 1 wherein said first member has an elongated support portion having a spiked end at one end thereof and wherein said holding portion is attached to the opposite end of said support portion.

5. The adjustable support of claim 4 wherein said first member has protrusions adjacent said one end thereof for providing a stable support when said spiked end is anchored by a weight.

6. The adjustable support of claim 1 wherein said means for holding a workpiece comprises a downwardly bent hook having the shape of the larger portion of a circle.

7. The adjustable support of claim 6 wherein said bend comprises a pointed end which can be used for removing lids and the like.

8. The adjustable support of claim 1 wherein said opening at one end of said first member is made of flattened material.

9. The adjustable support of claim 1 wherein said tapered, solid and round or solid and triangular.

10. The adjustable support of claim 1 wherein said holding portion ofsaid first member comprises an annulus and said tapered section of said second member further comprises a raised portion at the small end of said tapered section, whereby said raised portion can abut against the external side of said annulus so as to prevent said tapered section from slipping out of said annulus unintentionally.

11. The adjustable support of claim 1 wherein said tapered section is a solid annulus having a round cross section.

12. The adjustable support of claim 1 wherein said tapered section is a solid annulus having a triangular cross section.

13. A two-part, adjustable support, comprising:
a fixed part having means for mounting itself in an upright position on a horizontal surface and including a flat support portion and means for holding said flat portion spaced up from said horizontal surface, said support portion having an opening, the edges of said opening lying generally in a horizontal orientation within the plane of said flat portion, and an adjustable part comprising an elongated member having at one end thereof a tapered portion, the narrow end of which can fit into said opening, the wide end of which is wider than the maximum dimension of said opening, said opening and said tapered portion being sized and shaped so that said tapered portion of said adjustable part can be partially inserted into said opening and tilted so that it can be mounted in any of a range of angular positions in said opening and be self supporting, so as to provide a wide range of adjustable support positions and a plurality of heights at the opposite end of said adjustable part, the other end of said elongated member having means for supporting a workpiece thereat.

14. The two-part adjustable support of claim 13 wherein said support portion comprises a ring which is attached to said fixed part such that said ring lies generally in a horizontal plane.

15. The adjustable support of claim 14 wherein said ring is circular so that said tapered portion can move in a circular path within said ring.

16. The adjustable support of claim 13 wherein said fixed part comprises a single-piece wire member comprising an elongated straight part and a part which is bent at an angle to said straight part and shaped to form a loop, said loop constituting said support portion, said adjustable part comprising another single-piece wire member, one end of which is bent into a loop to form said tapered portion, said loop having a triangular shape.

17. The adjustable support of claim 16 wherein said single-piece wire member of said fixed part has a spike at one end thereof for insertion in the earth and stop means for limiting the depth of insertion in the earth, and wherein said adjustble part has an insulative handle thereon adjacent said triangular loop thereof.

* * * * *